United States Patent
Oberlaender et al.

(10) Patent No.: US 7,296,134 B2
(45) Date of Patent: Nov. 13, 2007

(54) FAST UNALIGNED MEMORY ACCESS SYSTEM AND METHOD

(75) Inventors: Klaus J. Oberlaender, Neubiberg (DE); Erik K. Norden, Unterhaching (DE)

(73) Assignee: Infineon Technologies AG, Neubiberg (DE)

( * ) Notice: Subject to any disclaimer, the term of this patent is extended or adjusted under 35 U.S.C. 154(b) by 515 days.

(21) Appl. No.: 10/777,570

(22) Filed: Feb. 11, 2004

(65) Prior Publication Data

US 2005/0177699 A1    Aug. 11, 2005

(51) Int. Cl.
*G06F 12/00* (2006.01)
*G06F 13/00* (2006.01)

(52) U.S. Cl. .................. 711/201; 711/154; 711/202

(58) Field of Classification Search ............ 711/3, 711/100, 118, 127, 154, 157, 200, 202, 201
See application file for complete search history.

(56) References Cited

U.S. PATENT DOCUMENTS

| | | | | |
|---|---|---|---|---|
| 4,908,789 A | * | 3/1990 | Blokkum et al. | 711/172 |
| 5,511,029 A | * | 4/1996 | Sawada et al. | 365/201 |
| 5,530,837 A | * | 6/1996 | Williams et al. | 711/157 |
| 5,587,950 A | * | 12/1996 | Sawada et al. | 365/201 |
| 5,703,828 A | * | 12/1997 | Park et al. | 365/230.03 |
| 5,987,574 A | * | 11/1999 | Paluch | 711/158 |
| 6,260,101 B1 | * | 7/2001 | Hansen et al. | 711/5 |
| 6,449,209 B1 | * | 9/2002 | Lee | 365/230.03 |
| 6,570,803 B2 | * | 5/2003 | Kyung | 365/222 |
| 6,754,116 B2 | * | 6/2004 | Janik et al. | 365/201 |
| 2002/0097629 A1 | * | 7/2002 | Lee | 365/230.03 |

* cited by examiner

*Primary Examiner*—Tuan V. Thai
(74) *Attorney, Agent, or Firm*—Dickstein, Shapiro, LLP.

(57) ABSTRACT

A microprocessor system includes an address generator, an address selector, and memory system having multiple memory towers, which can be independently addressed. The address generator simultaneously generates a first memory address and a second memory address that is 1 row greater than the first memory address. The address selector determines whether the row portion of the first memory address or the second memory address is used for each memory tower. Because each tower can be addressed independently, a single memory access can be used to access data spanning multiple rows of the memory system.

20 Claims, 5 Drawing Sheets

FAST UNALIGNED MEMORY ACCESS SYSTEM AND METHOD

FIELD OF THE INVENTION

The present invention relates to microprocessor systems, and more particularly to a memory access system for a microprocessor system to efficiently retrieve unaligned data.

BACKGROUND OF THE INVENTION

Figure 1:
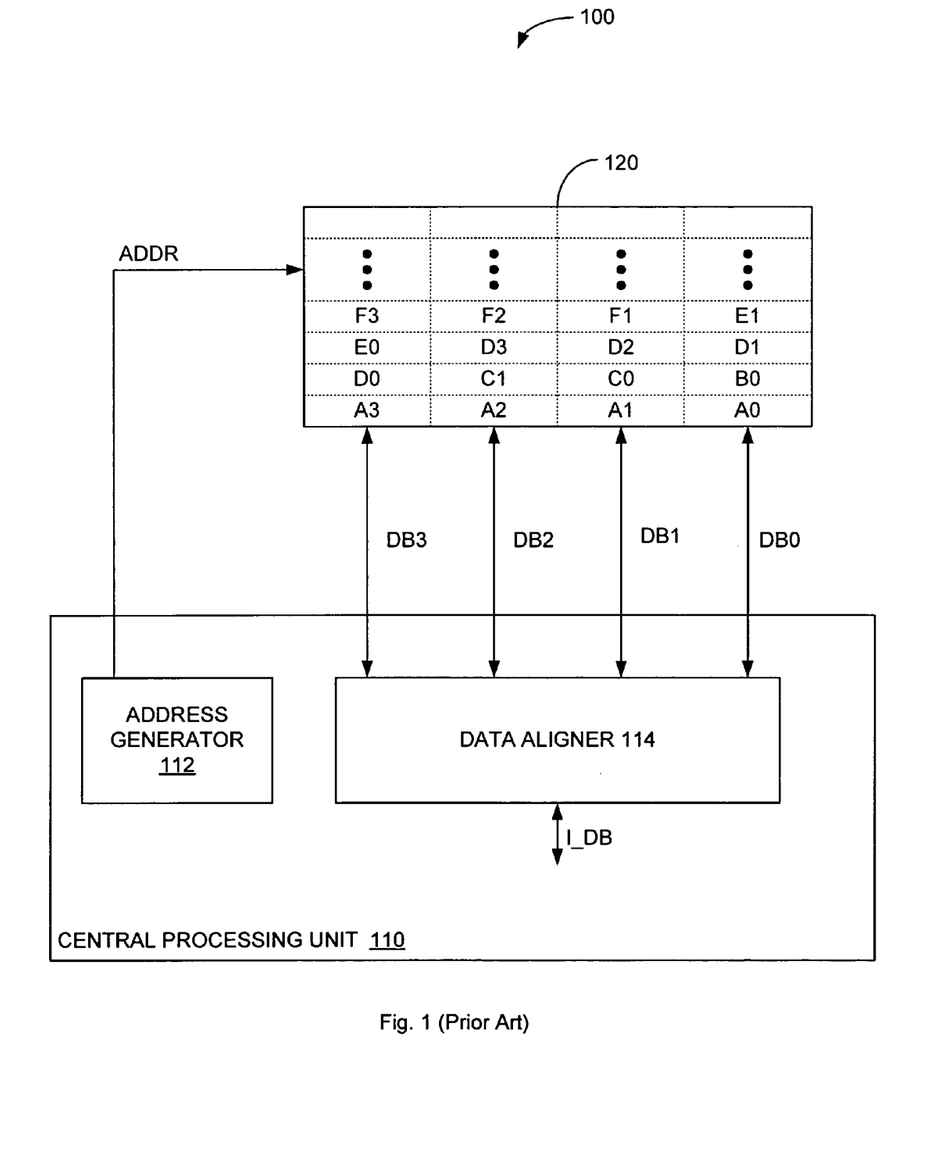
FIG. 1 is simplified block diagram of a conventional microprocessor system.

FIG. 1 is a simplified block diagram of a conventional microprocessor system 100 having a central processing unit (CPU) 110 coupled to a memory system 120. CPU includes an address generator 112, a data aligner 114 and various pipelines and execution units (not shown). Address generator 112 provides a memory address ADDR to memory system 120. Memory address ADDR is used to activate a row of memory system 120. In general a memory address includes a row portion that forms a row address for memory system 120. The remaining bits of the memory address designate a specific portion of the memory row. For clarity, the description herein assumes that the bottom row of memory system 120 has a row address of 0. Each successive row has a row address that is one row offset more than the previous row. The row offset depends on the number of words on each row of the memory. Furthermore, memory system 120 is described as being 64 bits wide and is conceptually divided into 4 16 bit half words. CPU 110 uses data aligner 114 to load data from or store data to memory system 120. Specifically, data aligner 114 couples a 64 bit internal data bus I_DB to memory system 120 using four 16 bit data buses DB0, DB1, DB2, and DB3. Conceptually internal data bus I_DB contains four 16 bit data half words that can be reordered through data aligner 114.

CPU 110 may access memory system 120 with multiple store and load instructions of different data width. For example, CPU 110 may support instructions that work with 8, 16, 32, 64, 128, 256 or 512 bit data widths. Furthermore, CPU 110 may support storing and loading of multiple data words simultaneously using a single access. For example, CPU 110 may write four 16 bit data words simultaneously as a single 64 bit memory access.

The ability to access data having different data widths may result in unaligned data. As illustrated in FIG. 1, memory system 120 contains data sets A, B, C, D, E, and F. Each data set is separated as one or more half words in memory system 120. For example, data set A includes half words A1, A1, A2, and A3. Data set B includes half word B0. Data set C includes half words C0 and C1. Data set D includes half words D0, D1, D2, and D3. Data set E includes half word E0 and E1. Data set F includes half words F1, F2, F3, and F4 (not shown). Data set A, which is located completely in row 0, is aligned data and can easily be retrieved in one memory access. However, data set D is located in both row 1 and row 2. To retrieve data set D, a conventional CPU 110 must access memory system 120 twice. First to retrieve half word D0 in row 1 and then to retrieve half words D1, D2, and D3 in row 2.

Because memory bandwidth is one of the main factors limiting the performance of microprocessor system 100, requiring multiple memory access to retrieve a single data set greatly decreases the performance of microprocessor system 100. For microprocessor system 100, memory system 120 decreases performance by up to fifty percent. Replacing memory system 120 with a dual ported memory can eliminate the need for two memory accesses. However, dual ported memories greatly increase silicon cost (i.e. area) of the memory system as well as the power consumption of the memory system. Furthermore, dual ported memories typically have lower access times than single ported memories. Hence there is a need for a method or system that provides fast unaligned access to a memory system without requiring high power utilization or large silicon area.

SUMMARY

Accordingly, a microprocessor system in accordance with the present invention, uses a memory system which can support access to two rows of memory using a single memory access. For example in one embodiment of the present invention, a memory system is divided into multiple towers that can be addressed independently. The CPU simultaneously generates a row address and the row address plus 1. An address selector determines whether the address or the address plus 1 should be used with each tower. Because the towers receive independent addresses different rows of each towers can be accessed simultaneously to support unaligned data in a single memory access.

In one embodiment of the present invention, the microprocessor system includes a first adder for generating the first memory address and a second adder to generate the second memory address. The first adder adds a first address operand and a second address operand. The second adder adds the first address operand, the second address operand and a carry bit.

The present invention will be more fully understood in view of the following description and drawings.

DETAILED DESCRIPTION

As explained above, conventional microprocessor systems do not provide adequate memory bandwidth for data sets stored in more than one row of a memory system. While using a dual port memory provides higher bandwidth, the cost in silicon area and power for the dual port memory prevents wide spread use of dual port memories. The present invention provides a novel microprocessor system that allows retrieval or storage of a data set on multiple rows of a memory system using a single memory access without the detriments associated with a dual port memory system.

Figure 2:
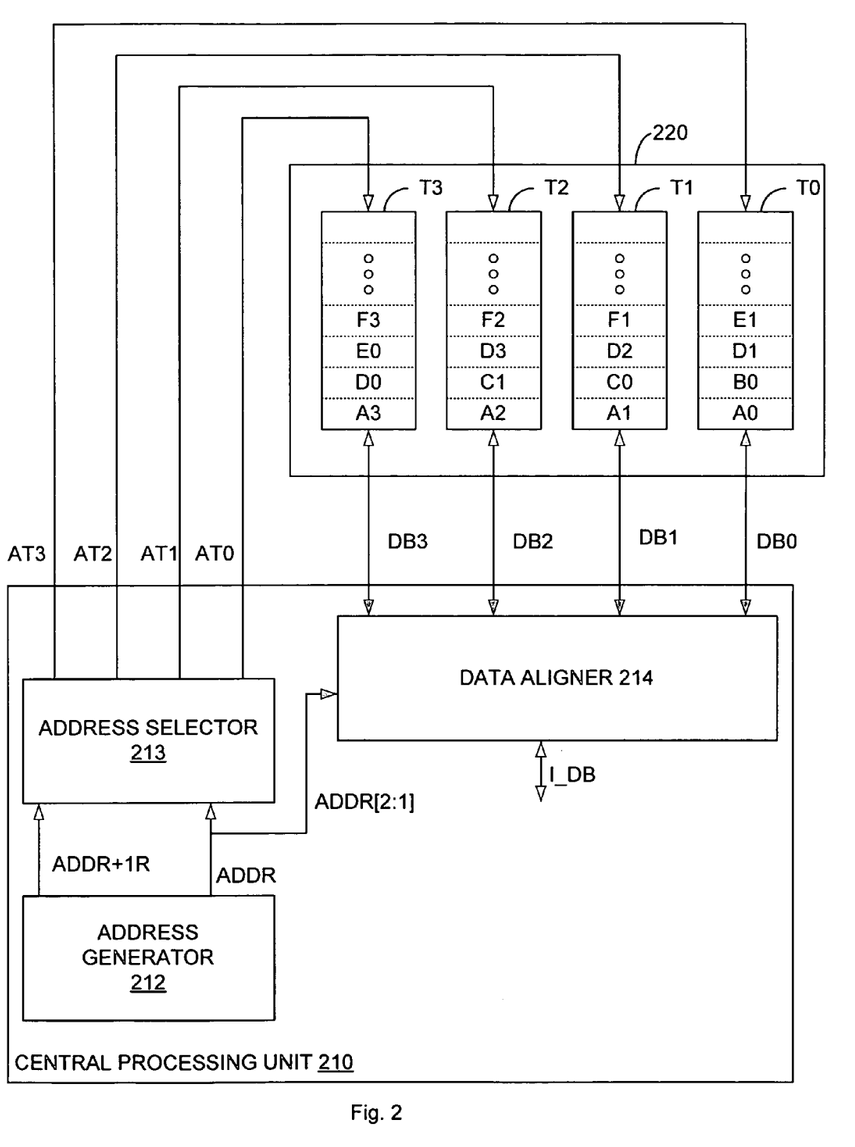
FIG. 2 is simplified block diagram of a novel microprocessor system in accordance with one embodiment of the present invention.

FIG. 2 is a simplified block diagram of a microprocessor system 200 in accordance with one embodiment of the present invention. Microprocessor system 200 includes a CPU 210 and a memory system 220. Memory system 220 includes four memory towers T0, T1, T2, and T3. Each memory tower receives an independent row address. However, the general addressing scheme of memory system 220 treats the towers as each providing a slice of data in the memory system. For example, if towers T0, T1, T2, and T3 are 16 bits wide, memory system 220 can be addressed to a granularity of one byte, and address b'00000000 (where a lower case b following a series of "1" and "0" denotes a binary number) refers to the first byte of tower T0, then half word A0 is located at address b'00000001 and b'00000000. Half word A1 is located at address b'00000010 and b'00000011. Half word A2 is located at address b'00000100 and b'00000101. Half word A3 is located in address b'00000110 and b'00000111. For clarity 8 bit numbers are used for memory addresses herein. However, in actual implementation the size of the memory address is dictated by the size of memory system 220. Furthermore, for the examples contained herein the row address of a memory address comprises five bits.

For clarity, when a portion of a binary number is used the notation [x:y] is appended to the reference, where x is the highest order bit in the desired portion and y is the lowest order bit in the desired portion (where the first bit on the right is considered to be bit 0). Thus, address bits ADDR [2:0] refers to bit 2, bit 1, and bit 0 of address ADDR. Furthermore when a single bit of a binary number is used, the notation [x] is appended to the reference, where x is the bit number. Thus, address bit ADDR[1] refers to bit 1 of address ADDR.

Address bits ADDR[2:1] designates which tower the starting point of an address is located. Specifically, b'00 represents tower T0, b'01 represents tower T1, b'10 represents tower T2, and b'11 represents tower T3. Bit 0 determines whether the desired data is in the first byte or the second byte of the appropriate tower. In general bit 0 will be equal to b'0 unless 8 bit data sets are being accessed. The higher order bits (i.e. bit 7 to bit 3) are the row address for memory system 220. For clarity, row addresses used herein are 5 bits to distinguish the row address from the full 8 bit memory address. Thus, In general row address b'00001 would indicate the row of memory system 220 containing half words D0, C1, C0, and B0 in FIG. 2. However as explained in detail below, memory systems in accordance to the present invention allow simultaneous access of data from multiple rows.

CPU 210 includes an address generator 212, address selector 213, data aligner 214, and various pipelines and execution units (not shown). Generally, address generator 212 is part of a load/store pipeline and generates addresses by adding address operands. Address generator 212 generates two memory addresses for memory system 220. Specifically, address generator 212 generates address ADDR and address ADDR+1R, where address ADDR+1R is equal to address ADDR plus one row of memory. Thus, using the 8 bit example from above, if address ADDR is equal to b'00001100, address ADDR+1R would be equal to b'00010100. That is address ADDR+1R is equal to address ADDR plus b'1000. Because the lower address bits for address ADDR+1R are for the most part irrelevant for row addressing, some embodiments of the present invention only generate the higher order bits for address ADDR+1R.

In most conventional microprocessor systems, a single address is provided to a memory system, which then manipulates the address (which would often involve performing addition steps) to provide the appropriate data values. However, this address manipulation occurs sequentially with the initial address generation. Because address generation is generally in a critical path for memory timing the additional time required for address manipulation would greatly limit the overall speed of the microprocessor system. Because address generator 212 generates address ADDR and address ADDR+1R simultaneously for the memory system, additional address manipulation greatly reduced and the overall memory timing is improved.

Address selector 213 receives address ADDR+1R and address ADDR and then generates separate row address for each tower of memory system 220. Specifically, address selector generates row addresses AT0, AT1, AT2, and AT3, for towers T0, T1, T2, and T3, respectively. In the embodiment of FIG. 2, address selector determines the appropriate values for addresses AT0, AT1, AT2, and AT3 using address bits ADDR[2:1]. Specifically, addresses AT0-AT4 are set equal to either the row address portion of address ADDR (i.e. ADDR[7:3]) or the row address portion of address ADDR+1R (i.e. ADDR+1R[7:3]). Table 1 provides the value for addresses AT0, AT1, AT2, and AT3 based on address bits ADDR[2:1].

TABLE 1

| ADDR [2:1] | AT3 | AT2 | AT1 | AT0 |
|---|---|---|---|---|
| 00 | ADDR | ADDR | ADDR | ADDR |
| 01 | ADDR | ADDR | ADDR | ADDR + 1R |
| 10 | ADDR | ADDR | ADDR + 1R | ADDR + 1R |
| 11 | ADDR | ADDR + 1R | ADDR + 1R | ADDR + 1R |

Thus, for example, to access data set A (i.e. half words A3, A2, A1, and A0), address generator 212 generates address ADDR to equal b'00000000 and address ADDR+1R to equal b'00000000 (i.e., address ADDR+b'1000). Address selector 213 generates row dresses AT3, AT2, AT1, and AT0 to all equal the row address portion of address ADDR (i.e., b'00000). However, to access data set D (i.e. half words D3, D2, D1, and D0), address generator 212 generates address ADDR to equal b'00001110 and address ADDR+1R to equal b'00010110 (i.e. address ADDR+b'1000). Because address bits ADDR[2:1] equals b'11, address selector 213 generates address AT0 to be equal to the row portion of address ADDR (i.e. b'00001) and generates row addresses AT1, AT2, and AT3 to be equal to the row portion of address ADDR+1R (i.e. b'00010). On a load command, half words D0, D3, D2, and D1 would be provided to data aligner 214 on data buses DB3, DB2, DB1, and DB0, respectively. Thus, microprocessor system 200 can access a data set spread across multiple rows of memory system 220 with a single memory access.

Data aligner 214 rearranges the half words received on data buses DB3, DB2, DB1, and DB0 for proper alignment. Thus, for example, when half words D0, D3, D2, and D1 are received on data busses DB3, DB2, DB1, and DB0, the half words are realigned to be in the order D3, D2, D1, and D0 on internal data bus I_DB. An embodiment of data aligner 214 is described in detail below with respect to FIG. 5. Data aligner 240 receives address bits ADDR[2:1] to determine how the half words should be realigned. Table 2 illustrates the appropriate realignment based on address bits ADDR[2: 1]. In Table 2, internal data bus I_DB is divided into four half words I_DB3, I_DB2, I_DB1, and I_DB0. Where half word I_DB3 is the highest order half word and half word I_DB0 is the lowest order half word. Furthermore, table 2 uses DT0, DT1, DT2, DT3 to indicate the half word from memory towers T0, T1, T2, T3, respectively.

TABLE 2

| ADDR [2:1] | I DB3 | I DB2 | I DB1 | I DB0 |
|---|---|---|---|---|
| 00 | DT3 | DT2 | DT1 | DT0 |
| 01 | DT0 | DT3 | DT2 | DT1 |

TABLE 2-continued

| ADDR [2:1] | I DB3 | I DB2 | I DB1 | I DB0 |
|---|---|---|---|---|
| 10 | DT1 | DT0 | DT3 | DT2 |
| 11 | DT2 | DT1 | DT0 | DT3 |

Figure 3:
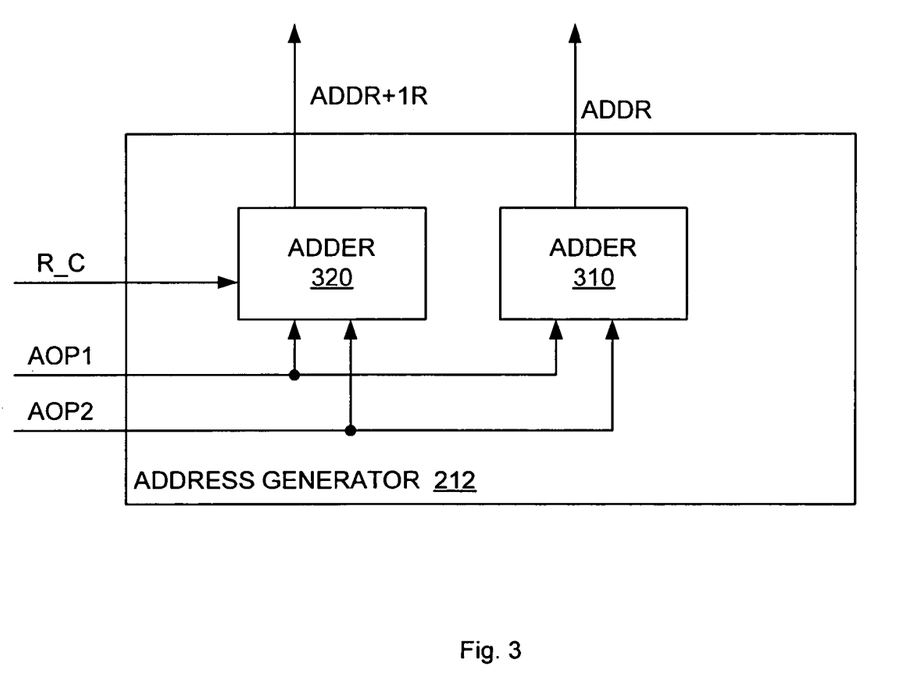
FIG. 3 is a block diagram of a novel address generator in accordance with one embodiment of the present invention.

FIG. 3 is a block diagram of an embodiment of address generator 212. Address generator 212 includes a first adder 310 and a second adder 320. First adder 310 receives a first address operand AOP1 and a second address operand AOP2. First adder 310 adds address operands AOP1 and AOP2 to generate address ADDR. As explained above, address generation is one of the critical paths that limit the bandwidth of a memory system. Therefore, address generator 212 includes a second adder 320 to generate address ADDR+1R in parallel with address ADDR. Adder 320 also receives address operand AOP1 and address operand AOP2. In addition, adder 320 receives a row carry signal R_C attached to the carry bit at the first bit of the row portion of address ADDR+1R. In other words the carry bit is at a bit position equivalent to the width of one row. For the examples given above, row carry signal is attached to the third bit of adder 320. Thus, address ADDR+1R is equal to address operand AOP1 plus address operand AOP2 plus 1 row. As explained above, only the row portion of address ADDR+1R is relevant; therefore, many embodiments of the present invention ignore the lower (non-row portions) of address operands AOP1 and AOP2 in generating address ADDR+1R.

Figure 4:
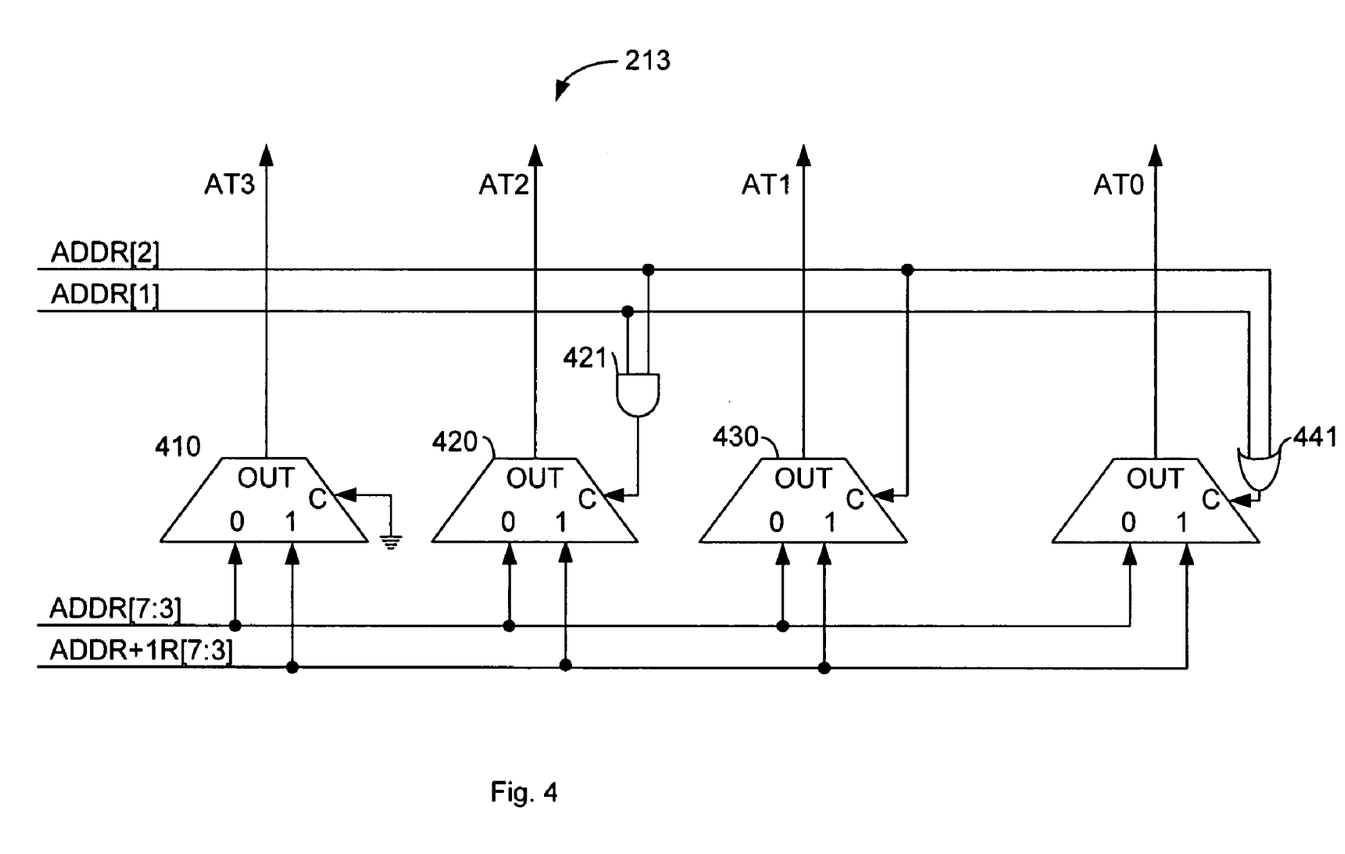
FIG. 4 is a block diagram of a novel address selector in accordance with one embodiment of the present invention.

FIG. 4 is a block diagram of one embodiment of address selector 213. In the embodiment of FIG. 4, address selector 213 includes multiplexers 410, 420, 430, and 440, AND gate 421, and OR gates 438. Each multiplexer has a first input port (labeled with a "0") coupled to the row portion of address ADDR (i.e. ADDR[7:3]) and a second input port (labeled with a "1") coupled to the row portion of address ADDR+1R (i.e. ADDR+1R[7:3]). Each multiplexer also has an output port OUT and a control terminal C. Output port OUT of multiplexers 410, 420, 430 and 440 provide row addresses AT3, AT2, AT1, and AT0, respectively. For clarity, the first input port of multiplexers 410, 420, 430, and 440 is selected for output when a logic 0 is applied to control terminal C of a multiplexer. Conversely, the second input port of multiplexers 410, 420, 430, and 440 is selected for output when a logic 1 is applied to control terminal C.

As shown in Table 1, row address AT3 is always set equal to the row portion of address ADDR (i.e. ADDR[7:3]). Thus control terminal C of multiplexer 410 is tied to ground. Some embodiments of the address selector 213 may omit multiplexer 410 and tie the row portions of address ADDR directly to tower T3. Row address AT2 should be equal to the row portion of address ADDR+1R when both address bit ADDR[2] and address bit ADDR[1] are both equal to logic 1, otherwise row address AT2 should be equal to the row portion of address ADDR. Thus, address bit ADDR[2] and address bit ADDR[1] are applied to the input terminals of AND gate 430, which has an output terminal coupled to control terminal C of multiplexer 420. As shown in Table 1, row address AT1 should be set equal to the row portion of address ADDR (i.e. ADDR[7:3]) when address bit ADDR[2] is logic 0. Conversely, row address AT1 should be set equal to the row portion of address ADDR+1R (i.e. ADDR+1R [7:3]) when address bit ADDR[2] is logic 1. Therefore, address bit ADDR[2] is applied to control terminal C of multiplexer 430. Row address AT0 should be equal to the row portion of address ADDR+1R (i.e. ADDR+1R[7:3], when either address bit ADDR[2] or address bit ADDR[1] is equal to logic 1. Conversely, row address AT0 should be equal to the row portion of address ADDR (i.e. ADDR[7:3]) when both address bit ADDR[2] an address bit ADDR[1] is equal to logic 0. Therefore, address bits ADDR[2] and ADDR[1] are applied to the input terminals of OR gate 441. The output terminal of OR gate 441 is coupled to control terminal C of multiplexer 440.

Figure 5:
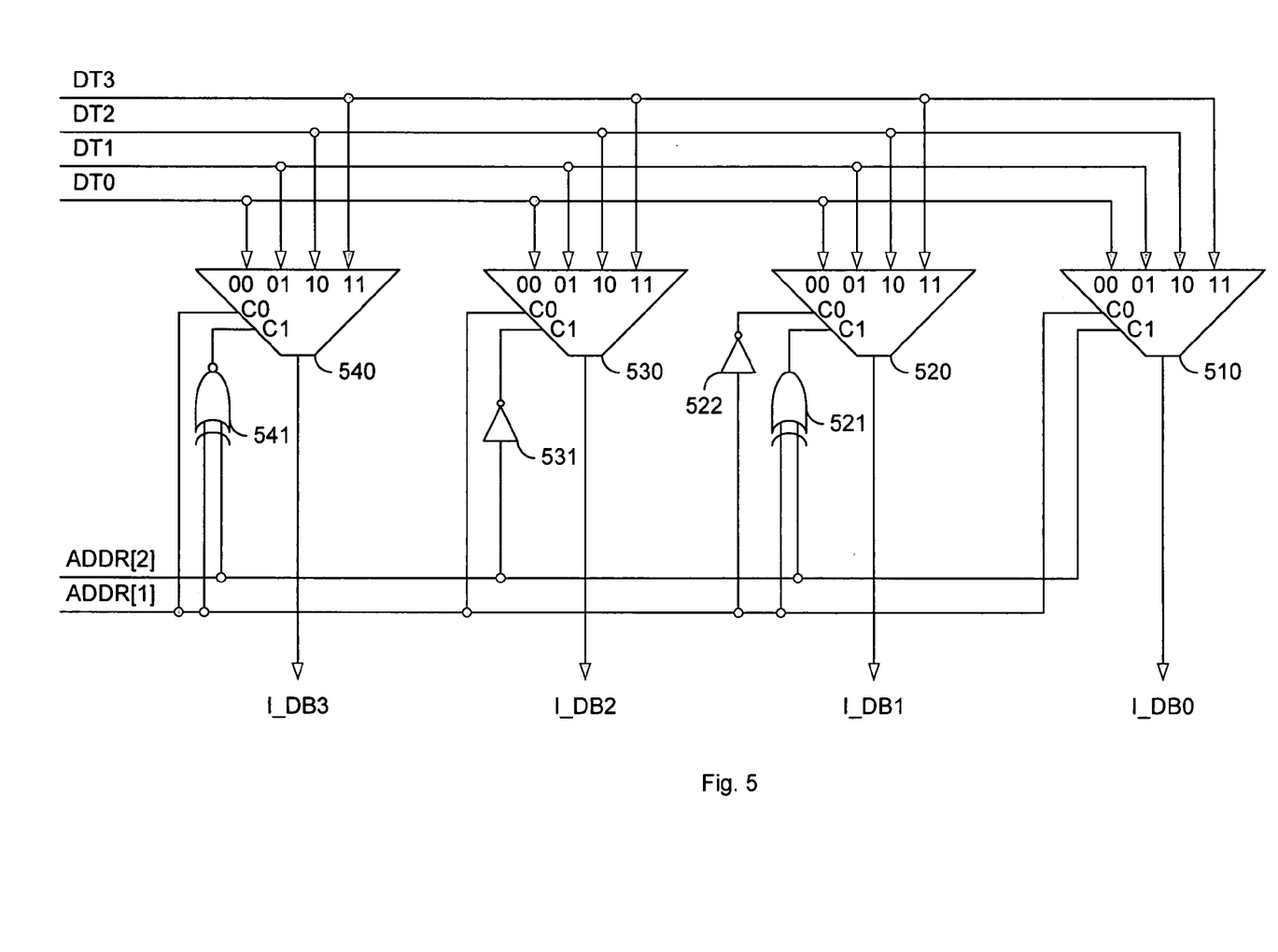
FIG. 5 is a block diagram of a data aligner in accordance with one embodiment of the present invention.

FIG. 5 is a block diagram of an embodiment of data aligner 214. Data aligner 214 includes multiplexers 510, 520, 530 and 540, a XOR gate 521, inverters 522 and 531, and an XNOR gate 541. As explained above, data aligner 214 implements table 2 above. For clarity, the notation of table 2 is also used in FIG. 5. Thus, internal data bus I_DB is divided into four half words I_DB3, I_DB2, I_DB1, and I_DB0. Where half word I_DB3 is the highest order half word and half word I_DB0 is the lowest order half word. Multiplexers 540, 530, 520, and 510 provide half words I_DB3, I_DB2, I_DB1, and I_DB0, respectively. Half words DT0, DT1, DT2, DT3 are the half word from memory towers T0, T1, T2, T3, respectively. In FIG. 5, half words DT0, DT1, DT2, and DT3 are applied to input terminals 00, 01, 10, and 11, respectively, of multiplexers 540, 530, 520, and 510. Address bit ADDR[1] is applied directly to control terminals C0 of multiplexers 540, 530, and 510. Control terminal C1 of multiplexer 540 is coupled to the output terminal of XNOR gate 541, which has input terminals that receive address bits ADDR[2] and ADDR[1]. Control terminal C1 of multiplexer 530 is coupled to address bit ADDR[2] through inverter 531. Control terminal C0 of multiplexer 520 is coupled to address bit ADDR[1] through inverter 522. Control terminal C1 of multiplexer 520 is coupled to the output terminal of XOR gate 521, which has input terminals that receive address bits ADDR[2] and ADDR[1]. Control terminal C1 of multiplexer 510 receives address bit ADDR[1].

In another embodiment of the present invention, data aligner 214 is implemented using a two level multiplexing system. The first level of multiplexers, which is controlled by address bit ADDR[2], either passes half words DT3, DT2, DT1 and DT0 straight through or swaps half word DT3 with half word DT1 and swaps half word DT2 with DT0. The second stage of multiplexers, which is controlled by address bit ADDR[1], either passes the data from the first multiplexers straight through, rotates the half words left by one half word, or rotates the half words right by one half word.

In the various embodiments of this invention, novel structures and methods have been described to provide high utilization of a CPU and a memory system. By using a multi-towered memory system having independent addressing, the CPU of a microprocessor systems in accordance with the present invention can access a data set spanning multiple rows of the memory system in a single memory access. The various embodiments of the structures and methods of this invention that are described above are illustrative only of the principles of this invention and are not intended to limit the scope of the invention to the particular embodiments described. For example, in view of this disclosure, those skilled in the art can define other memory systems, memory towers, address generators, address selectors, data widths, multiplexers, data aligners, and so forth, and use these alternative features to create a method or system according to the principles of this invention. Thus, the invention is limited only by the following claims.

What is claimed is:

1. A microprocessor system comprising:
   an address generator configured to simultaneously generate a first memory address and a second memory address, wherein the address generator comprises a first adder configured to generate the first memory address, and a second adder configured to generate the second memory address;
   a memory system having a first memory tower and a second memory tower; and
   an address selector coupled to receive the first memory address and the second memory address and configured to select a first row address for the first memory tower and a second row address for the second memory tower.

2. The microprocessor system of claim 1, wherein the first row address is equal to a row portion of the first memory address, and the second row address is equal to a row portion of the second memory address.

3. The microprocessor system of claim 1, wherein the first row address is equal to a row portion of the second memory address, and the second row address is equal to a row portion of the first memory address.

4. The microprocessor system of claim 1, wherein the first adder adds a first address operand and a second address operand.

5. The microprocessor system of claim 4, wherein the second adder adds the first address operand, the second address operand, and a carry bit.

6. The microprocessor of claim 4, wherein the second adder adds a portion of the first address operand, a portion of the second address operand, and a carry bit.

7. The microprocessor system of claim 1, wherein the second memory address is one memory row greater than the first memory address.

8. The microprocessor system of claim 7, wherein the address selector is configured to select a third row address for the third memory tower and a fourth row address for the fourth memory tower.

9. The microprocessor system of claim 1, wherein the second memory address has a row portion that is one greater than a row portion of the first memory address.

10. The microprocessor system of claim 1, wherein the second memory address is equal to a row portion of the first memory address plus 1.

11. The microprocessor system of claim 1, further comprising a data aligner coupled to the memory system.

12. The microprocessor system of claim 11, wherein the second row address is equal to a row portion of the second memory address.

13. The microprocessor system of claim 1, wherein the memory system further comprises a third memory tower and a fourth memory tower.

14. The microprocessor system of claim 1, wherein the address selector is controlled by one or more bits of the first memory address.

15. The microprocessor system of claim 1, wherein the first row address is equal to a row portion of the first memory address.

16. A method of accessing a memory system having a plurality of memory towers, the method comprising:
    simultaneously generating a first memory address and a second memory address by adding a first memory operand and a second memory operand to generate the first memory address, and adding the first memory operand, the second memory operand, and a carry bit to generate the second memory address;
    selecting a row portion of the first memory address as a first row address for a first memory tower; and
    selecting a row portion of the second memory address as a second row address for a second memory tower.

17. The method of claim 16, further comprising: performing a memory access using both the first row address and the second row address.

18. The method of claim 16, wherein the carry bit is at a bit position equivalent to a row width.

19. The method of claim 16, wherein the row portion of the second memory address is the same as the second memory address.

20. A method of accessing a memory system having a plurality of memory towers, the method comprising:
    simultaneously generating a first memory address and a second memory address by adding a first memory operand and a second memory operand to generate the first memory address, and adding a row portion of the first memory operand, a row portion of the second memory operand, and a carry bit to generate the second memory address;
    selecting a row portion of the first memory address as a first row address for a first memory tower; and
    selecting a row portion of the second memory address as a second row address for a second memory tower.

* * * * *

UNITED STATES PATENT AND TRADEMARK OFFICE
CERTIFICATE OF CORRECTION

PATENT NO. : 7,296,134 B2  Page 1 of 1
APPLICATION NO. : 10/777570
DATED : November 13, 2007
INVENTOR(S) : Klaus J. Oberlaender et al.

It is certified that error appears in the above-identified patent and that said Letters Patent is hereby corrected as shown below:

In the Specification:

Column 1, line 49, "words A1, A1," should read --words A0, A1,--

Column 3, line 35, "Thus, In" should read --Thus, in--

Column 4, line 28, "b'00000000" should read --b'000010000--

Column 4, line 29, "dresses" should read --addresses--

Column 4, line 64, "I DB3    I DB2    I DB1    1 DB0" should read

--I_DB3    I_DB2    I_DB1    1_DB0--

Column 5, line 4, "I DB3    fI DB2    I DB1    1 DB0" should read

--I_DB3    I_DB2    I_DB1    1_DB0--

Column 5, line 31, "one embodiment" should read --an embodiment--

Column 5, line 67, "(i.e. ADDR+1R[7:3]," should read
--(i.e. ADDR+1R[7:3])--

Signed and Sealed this

First Day of April, 2008

JON W. DUDAS
*Director of the United States Patent and Trademark Office*